United States Patent [19]

Kanatani et al.

[11] Patent Number: 5,032,021
[45] Date of Patent: Jul. 16, 1991

[54] LIQUID CRYSTAL PROJECTOR

[75] Inventors: Keiichi Kanatani, Hirakata; Shunichi Kishimoto, Kaizuka; Haruhisa Kosaka, Nara; Goro Hamagishi, Toyonaka, all of Japan

[73] Assignee: Sanyo Electric Co., Ltd., Osaka, Japan

[21] Appl. No.: 596,668

[22] Filed: Oct. 10, 1990

[30] Foreign Application Priority Data

| Oct. 11, 1989 [JP] | Japan | 1-264443 |
| May 28, 1990 [JP] | Japan | 2-138894 |
| May 28, 1990 [JP] | Japan | 2-138895 |

[51] Int. Cl.$^5$ .................................... G03B 21/16
[52] U.S. Cl. ......................... 353/54; 353/52; 350/331 R
[58] Field of Search .............. 33/54, 52; 350/331 R

[56] References Cited

U.S. PATENT DOCUMENTS

| 4,029,393 | 6/1977 | Dungan et al. | 350/331 R |
| 4,064,919 | 12/1977 | Stern et al. | 350/331 R |
| 4,643,525 | 2/1987 | Haim | 350/331 R |
| 4,848,875 | 7/1989 | Baughman et al. | 350/331 R |

Primary Examiner—William A. Cuchlinski, Jr.
Assistant Examiner—William C. Dowling
Attorney, Agent, or Firm—Armstrong, Nikaido, Marmelstein, Kubovcik, & Murray

[57] ABSTRACT

A liquid crystal display unit comprising a condenser lens, incident-side polarizing plate, liquid crystal panel and emanating-side polarizing plate is disposed in an optical path from a light source toward a projection lens. A cooler comprising a closed flat platelike glass container and a refrigerant enclosed in the container with a vacuum space of specified volume left therein is joined to each of the incident-side polarizing plate and the liquid crystal panel over an effective image area. The incident-size polarizing plate and the liquid crystal panel are prevented from overheating by the spontaneous convection and evaporation of the refrigerant and the condensation thereof within the space.

13 Claims, 8 Drawing Sheets

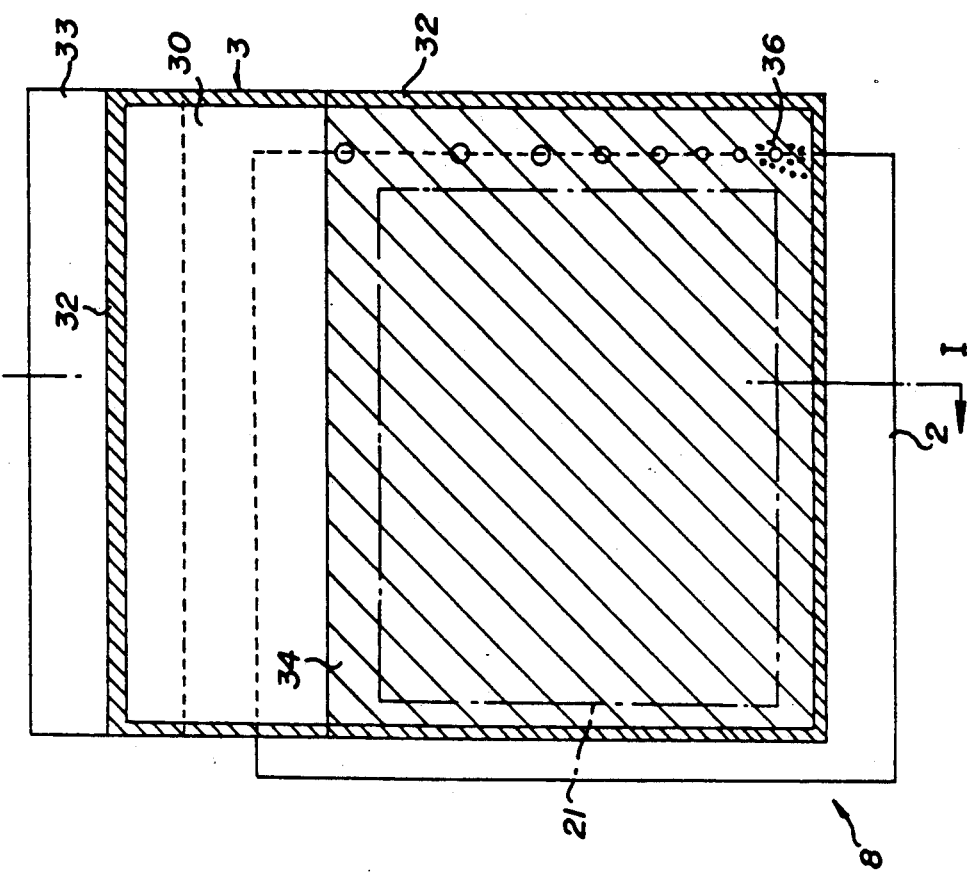
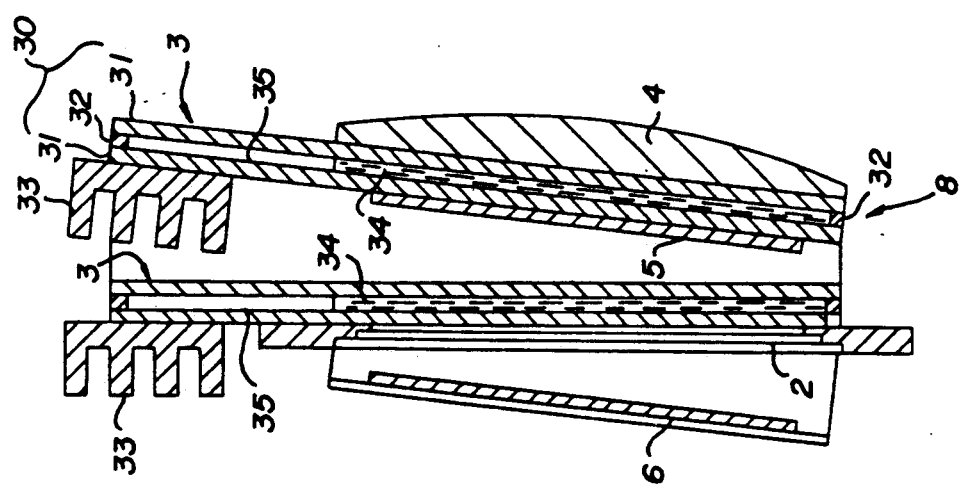

LIQUID CRYSTAL PROJECTOR

FIELD OF INDUSTRIAL APPLICATION

The present invention relates to liquid crystal projectors wherein a liquid crystal is used as an image display element for projecting images on a screen.

BACKGROUND OF THE INVENTION

Liquid crystal projectors including liquid crystal display units are disclosed, for example, in Unexamined Japanese Patent Publications SHO 61-150487 and SHO 64-74585.

FIG. 11 shows an example of such liquid crystal projectors. The illustrated projector has a projection lens 13 mounted on the front wall of a case 11, and a light source 12 opposed to the lens 13 and disposed at the rear end of the case 11 inside thereof.

A liquid crystal display unit 8 of the active matrix type is disposed between the light source 12 and the projection lens 13 on the optical axis. Blue light dichroic mirrors 14, 14a and red light dichroic mirrors 15, 15a are arranged, each as inclined at 45 degrees with the optical axis, between the liquid crystal unit 8 and the light source 12, and between the unit 8 and the projection lens 13.

Reflectors 16, 16a and 17, 17a are arranged as opposed to the respective dichroic mirrors 14, 14a and 15, 15a in parallel thereto, with liquid crystal units 8b and 8a interposed between the reflectors 16, 16a and between the reflectors 17, 17a, respectively.

Of the light emitted by the light source 12, the green light component passes through the dichroic mirrors 14, 15 and impinges on the liquid crystal unit 8, and the red light component and blue light component are respectively separated off by the red light dichroic mirror 14 and the blue light dichroic mirror 15 which are closer to the light source 12, are then reflected at the reflectors 16, 17 closer to the light source 12 and impinge on the respective liquid crystal display units 8b, 8a. When passing through the liquid crystal display unit, each light component is modulated with image data. The light components are combined again by the reflectors 16a, 17a and the red light and blue light dichroic mirrors 14a, 15a closer to the projection lens 13 to project an image on a screen 7 through the lens 13.

Since liquid crystals are exposed to very bright light in the liquid crystal projector 1, the temperature of the liquid crystal display units 8, 8a and 8b rises to a considerably high level.

Conventionally, therefore, the case 11 is provided with a fan (not shown) therein for cooling the units 8, 8a, 8b with air to prevent the rise of temperature.

However, because air is small in specific heat and further because the amount of heat transmission along the surface of glass is small, an attempt to use light of higher brightness gives rise to a need for the air cooling system to produce an increased amount of air current, consequently permitting the fan to give off a noise.

Unexamined Japanese Patent Publication HEI 1-159684 proposes an arrangement for forcibly circulating a liquid refrigerant to cool a liquid crystal unit. The arrangement, however, requires piping or circulation system for the refrigerant, is therefore complex in structure and has the problem of making the projector large-sized.

SUMMARY OF THE INVENTION

An object of the present invention, which has been accomplished in view of the problems heretofore experienced, is to provide a liquid crystal projector which produces no noise and is nevertheless excellent in cooling efficiency.

Another object of the present invention is to provide a liquid crystal projector wherein at least one of a liquid crystal display unit and a polarizing plate disposed in proximity thereto is provided with a cooler of the heat pipe type containing a refrigerant.

Another object of the present invention is to provide means for use in the liquid crystal display unit of a liquid crystal projector which means is adapted to smoothly effecting convention of a refrigerant within a cooler.

BRIEF DESCRIPTION OF THE DRAWINGS

FIG. 1 is a view in section taken along the line I—I in FIG. 2 and showing a liquid crystal display unit;

FIG. 2 is a front view of the unit;

EMBODIMENTS

Figure 3:
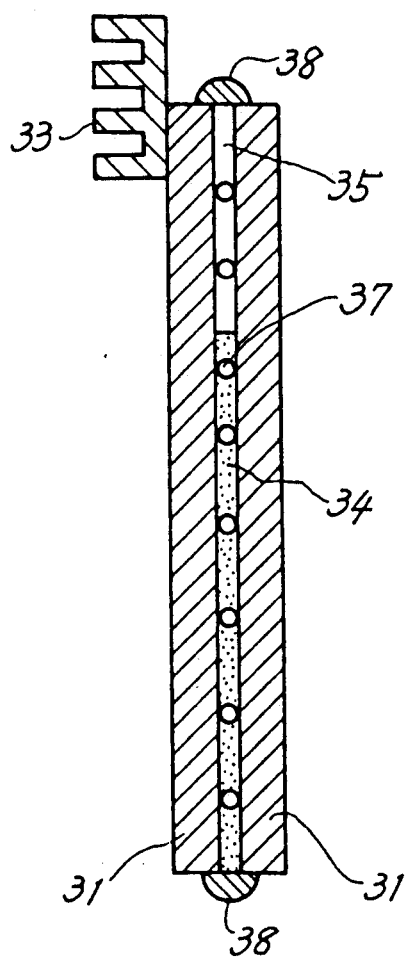
FIG. 3 and FIG. 4 are sectional views showing other embodiments.

The following description and the drawings are intended for a better understanding of the present invention and therefore should not be interpreted as limiting the scope of the claimed invention.

With reference to FIG. 1, a liquid crystal display unit 1 comprises a liquid crystal panel 2, and a polarizing plate 5 on the incident-side and a polarizing plate 6 on the emanating side which are arranged on opposite sides of the panel in proximity thereto. A condenser lens 4 is joined to the incident-side polarizing plate 5. The liquid crystal display unit 8 is so adapted that when a group of electrodes (not shown) connected to the liquid crystal panel 2 is driven, the liquid crystal material is caused at the positions corresponding to pixels to control passage of light. The construction of the unit 8 is known and therefore will not be further described in detail. The incident-side polarizing plate 5 and the liquid crystal panel 2, which become heated to a higher temperature than the emanating-side polarizing plate 6, are respectively provided with flat coolers 3, 3 of the heat pipe type. Each cooler 3 is adhered to the plate 5 or panel 2 with a transparent silicone adhesive, or fixed thereto as held in intimate contact therewith with application of silicone oil.

The cooler 3 comprises a flat glass container 30, and radiator fins 33 projecting from the upper end of the container. The glass container 30 comprises two flat glass plates 31, 31 and a glass frame 32 serving as a spacer.

The glass container 3 contains a deaerated fluorine-containing inert liquid, such as perfluorocarbon liquid ("Fluorinert" product of Sumitomo 3M Co., Ltd.), serving as a refrigerant and filled into the container after evacuating it to a vacuum. Also usable as refrigerants are a mixture of water and ethylene glycol, alcohol, acetone and the like.

The level of the refrigerant 34 is higher than the upper end of the effective image area 21 of the liquid crystal display panel 2. The upper space inside the container 30 serves as a condenser portion 35 for the evaporation or condensation of the refrigerant 34.

The operation of the coolers 3 will be described below.

When the liquid crystal display unit 8 is exposed to light, the polarizing plate 5 and the liquid crystal panel 2 are heated on absorption of heat. At this time, the temperature of central portion of display region rises especially, thereby causing spontaneous convection of the refrigerant 34 and permitting the refrigerant 34 to transfer heat to the upper portion. Consequently, the upper portion of the liquid layer within each cooler 3 is given the highest temperature, and the refrigerant 34 at this portion is evaporated. The vapor flows within the space 35 and returns to a liquid by being cooled by the condenser portion having the radiator fins 33 attached thereto, whereupon the liquid falls. As a result, the heat transferred as absorbed by the vapor is released outside by the radiator fins 33.

On the other hand, the upper portion of the liquid layer is deprived of a large amount of heat by the evaporation of the refrigerant 34, so that the convection of the refrigerant 34 is promoted.

Thus, the heat of the polarizing plate 5 and the liquid crystal panel 2 is efficiently released to prevent the rise of the temperature.

When the refrigerant 34 is heated to a high temperature, the liquid phase is likely to boil to produce bubbles, which will affect images when appearing within the effective image area. According to the present embodiment, however, aluminum particles are adhered to the inner surface of the glass container 30 outside the effective image area, or the inner surface is roughed with sandpaper, to form nuclei 36 for generating bubbles. Accordingly, bubbles, if produced, occur at the nuclei 36 and exert no influence on images.

FIG. 3 is a sectional view showing a cooler as another embodiment.

With this embodiment, minute glass beads 37 are provided between a pair of flat glass plates 31, 31 to serve as spacers for forming a very small gap (of 30 to 50 μm). The outer periphery of the gap is sealed off with frit 38 to form a closed container with a refrigerant enclosed therein as a working fluid. This embodiment is characterized in that it is much smaller in thickness and volume, i.e., in size, than the embodiment of FIG. 1.

Figure 4:
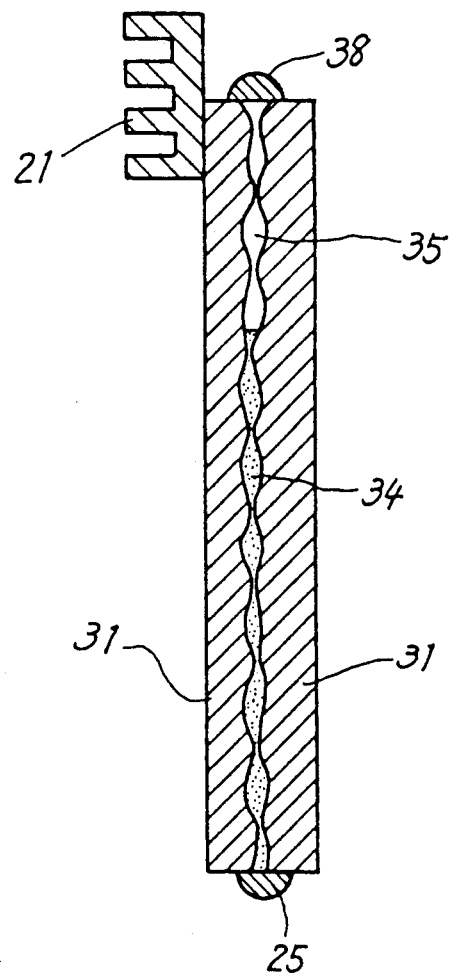

FIG. 4 shows a cooler as another embodiment.

This embodiment comprises a pair of flat glass plates 31, 31 having roughed inner surfaces opposed to each other and sealed off along their outer peripheries with frit 38 to form a closed container, with a gap of about 30 to about 50 μm formed between the rough surfaces.

Figure 5:
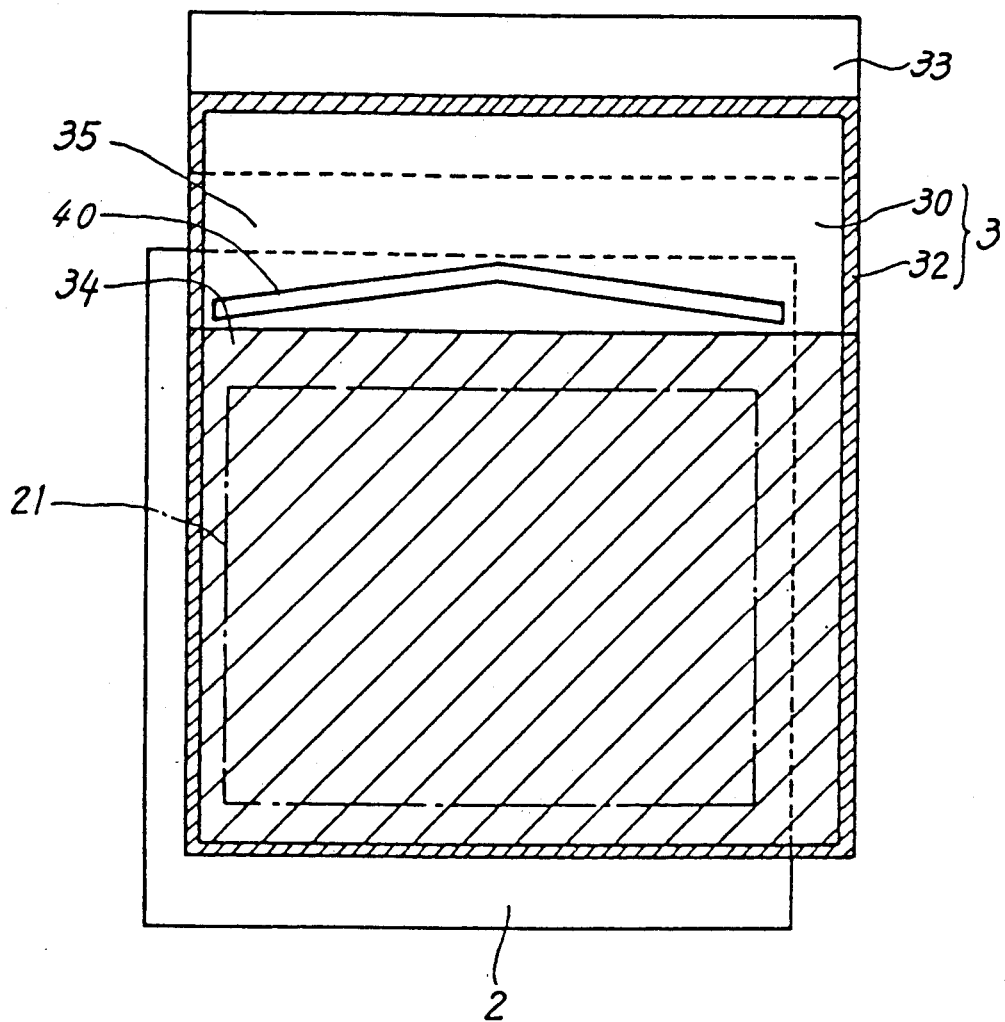
FIG. 5 is a front view partly broken away and showing another embodiment.
Figure 6:
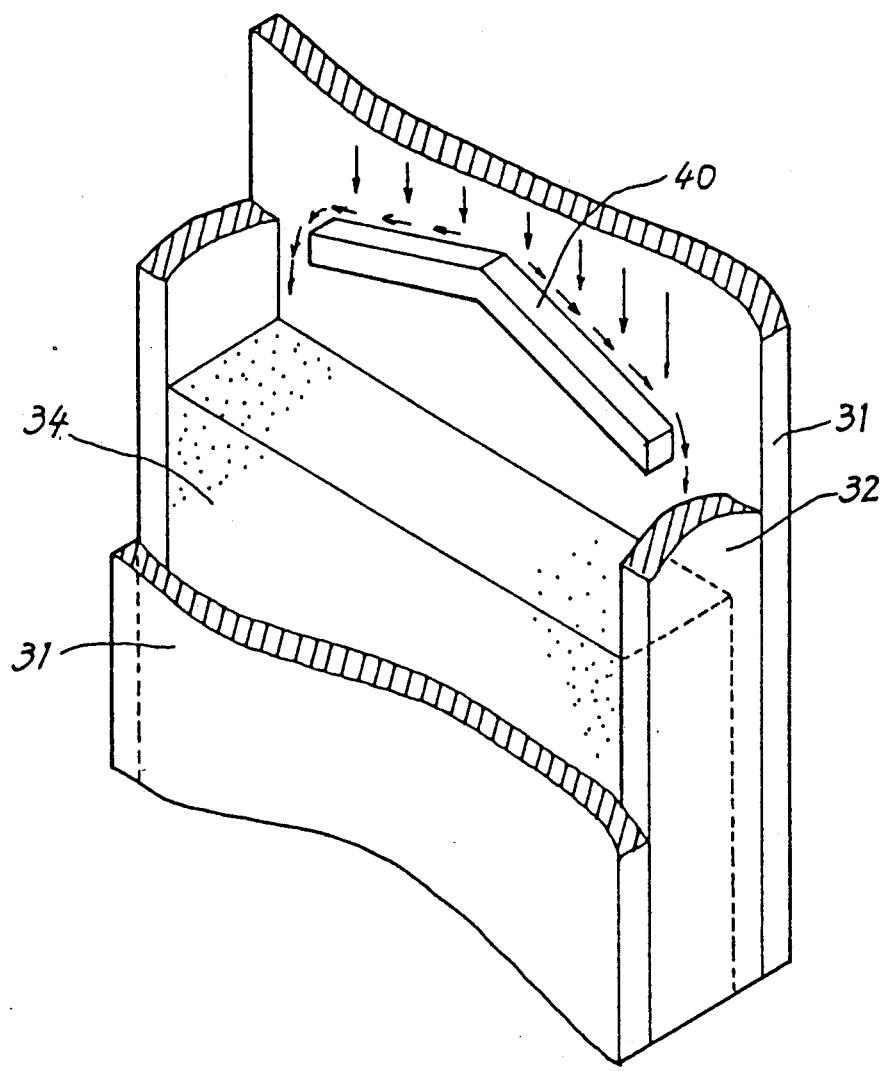
FIG. 6 is a perspective view partly broken away and showing the same embodiment.
Figure 7:
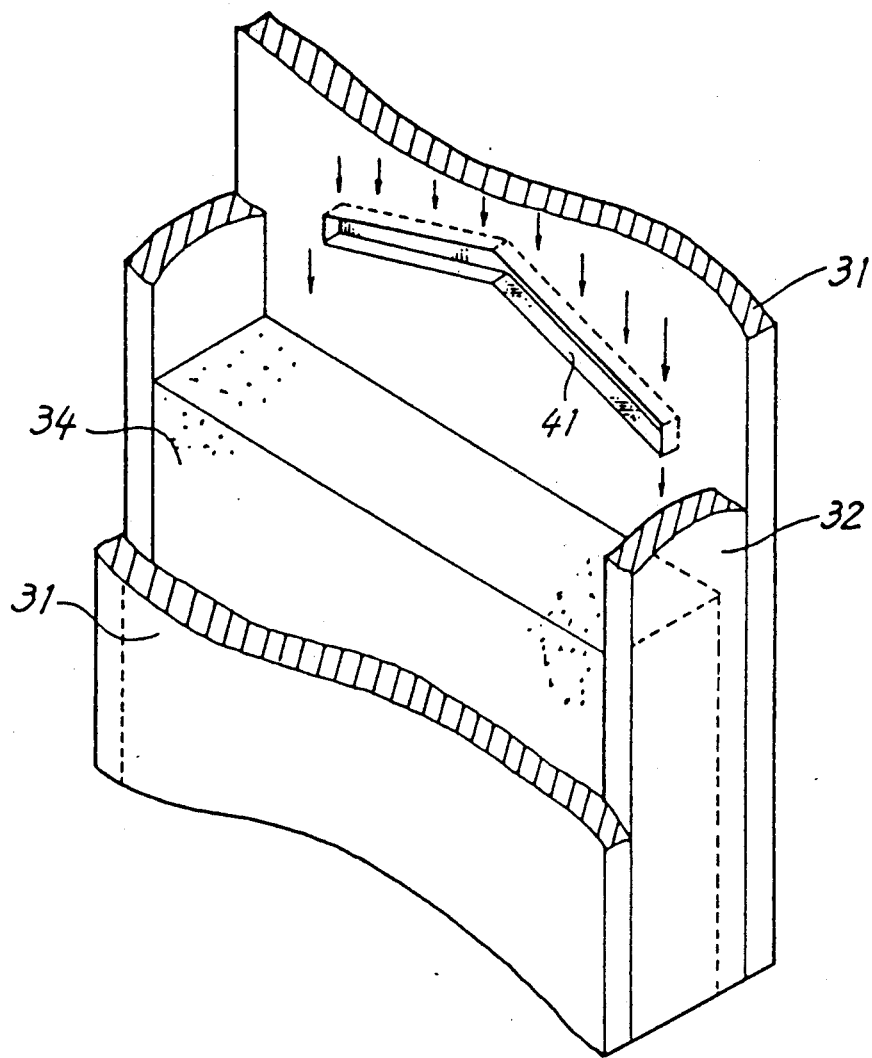
FIG. 7 is a perspective view partly broken away and showing another embodiment.

FIGS. 5, 6 and 7 show other embodiments of the present invention. The cooler 3 of each of these embodiments has an upper condenser portion 35, the front and rear walls of which are each provided with a guide ridge 40 or guide furrow 41 (FIG. 7) positioned close to the level of a refrigerant 34 and outside an effective image area 21 and having at least one end which is inclined downward toward the side wall of the cooler 3.

The guide ridge 40 is provided by affixing frit, metal plate or glass plate to the inner surface of each of the front and rear walls, i.e., flat glass plate 31.

The refrigerant condensed at the upper condenser portion 35 of the cooler 3 flows along the guide ridge 40 or guide furrow 41 and drips from opposite ends thereof inside the cooler 3 and close to the side walls thereof. Accordingly, the refrigerant evaporates at the middle portion of surface of the liquid refrigerant and returns to the end portions of the liquid surface, undergoing smooth convection to transfer an increased amount of heat.

The guide ridge 40 or guide furrow 41 may be inclined downward from one end toward the other end.

Although the cooler 3 is not attached to the emanating-side polarizing plate 6 which becomes less heated than the incident-side polarizing plate 5, the plate 6 can of course be provided with the cooler 3.

The cooler 3 can of course be attached only to the liquid crystal panel 2 or to the polarizing plate.

Figure 8:
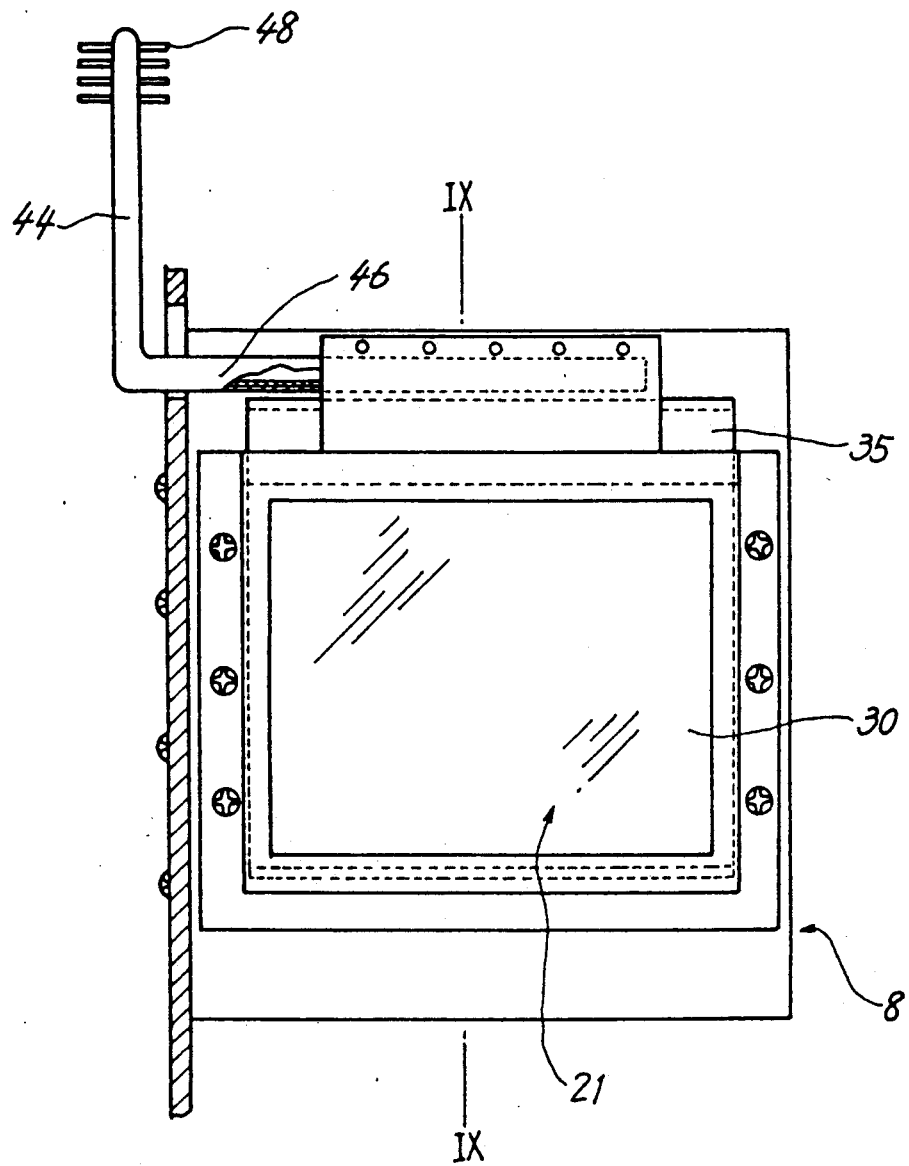
FIG. 8 is a front view partly broken away and showing another embodiment.
Figure 9:
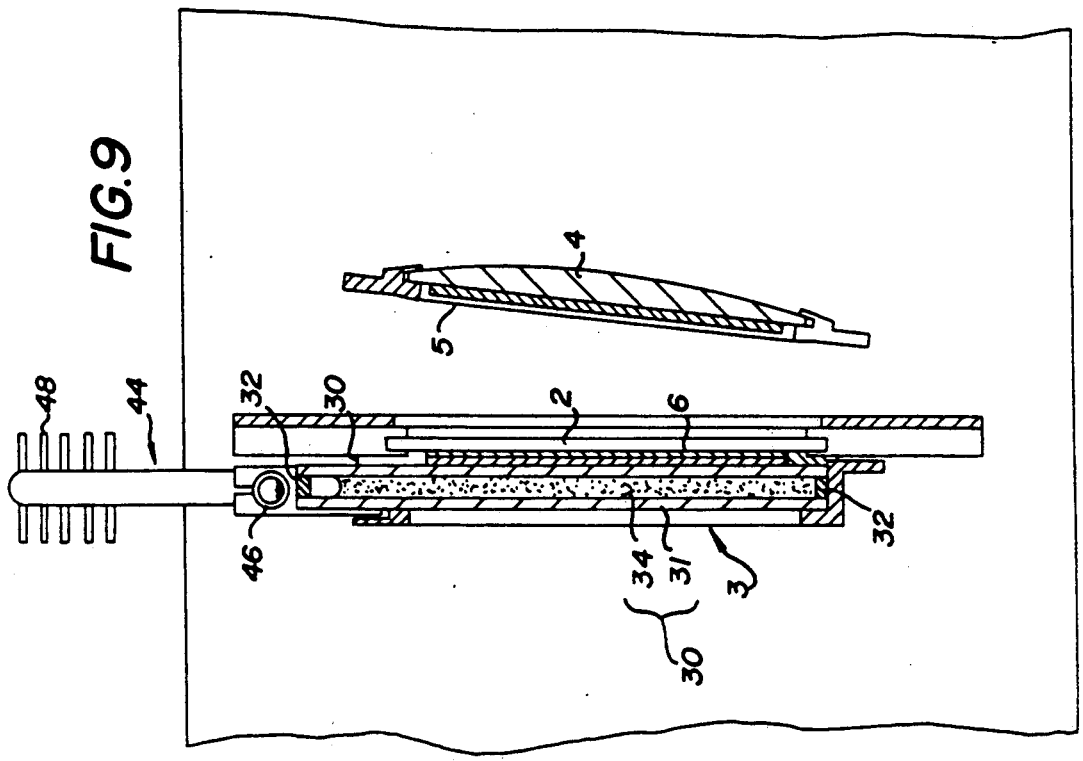
FIG. 9 is a view in section taken along the line IX—IX in FIG. 8 and showing the same.

FIGS. 8 and 9 show another embodiment of the invention.

This embodiment comprises a glass container 30 made of flat glass plates and having a condenser portion 35, and an L-shaped heat pipe 44 held at its base end portion 46 between the glass plates. The heat pipe 44 comprises a closed copper pipe containing a small amount of working fluid (alcohol or Freon), which is enclosed therein after evacuating the pipe to a vacuum. The heat pipe 44 has radiator fins 48 attached to its outer end.

When the space 35 of the glass container 30 is full of a refrigerant gas, the heat pipe 44 has its inside working fluid vaporized with the heat transferred thereto, thus removing heat of vaporization from inside the glass container 30 and condensing the refrigerant therein. On the other hand, the vaporized working fluid of the heat pipe 44 is condensed by being cooled by the radiator fins 48, flows down the pipe, returns to its base end portion 46 and is subjected to heat exchange with the vapor within the space 35 of the container 30.

This embodiment has the advantage that when the pipe 44 is extended with the radiator fins attached to the extended end and positioned in a low-temperature region of the projector case, e.g., close to an air intake opening (not shown) thereof, the condensation of the refrigerant gas can be accelerated to achieve a higher cooling efficiency.

If the base end portion 46 of the heat pipe 44 is disposed in the space 35 of the glass container 30, a further improved heat-exchange efficiency can be achieved.

Alternatively, the base end portion 46 of the heat pipe 44 may be held in communication with the space 35 of the glass container 30. This causes the refrigerant in the glass container 30 to reach the radiator fins 48 of the heat pipe 44 on evaporation to undergo condensation and return to the interior of the glass container again, whereby the liquid crystal display unit can be cooled more effectively.

Figure 10:
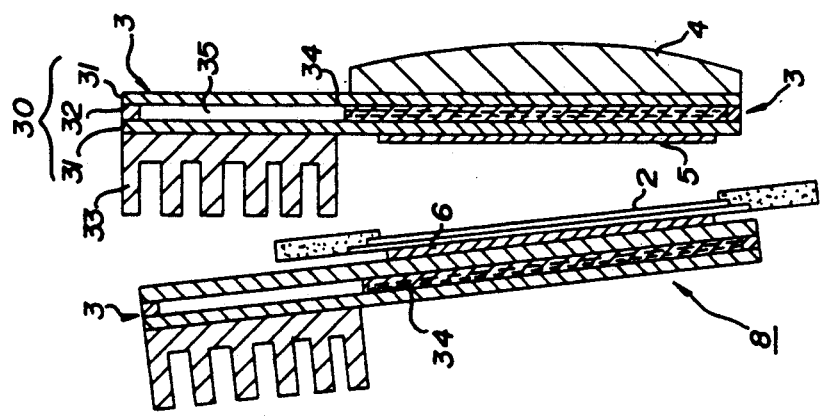
FIG. 10 is a sectional view showing another embodiment.
Figure 11:
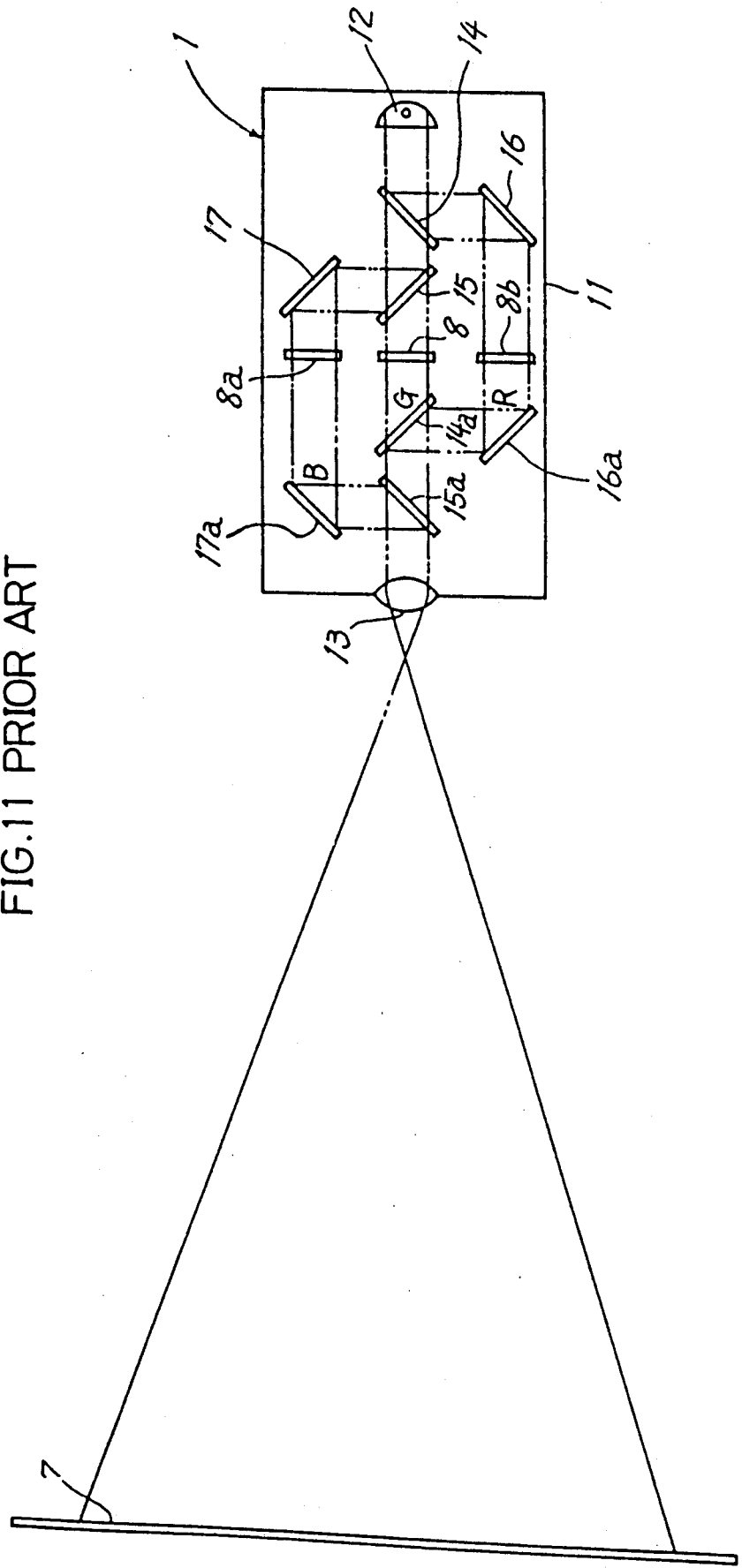
FIG. 11 is a diagram showing a conventional liquid crystal projector.

FIG. 10 shows another embodiment of the present invention which is an improvement over the foregoing embodiments.

When the glass containers 30 of the embodiments of FIGS. 1 to 9 are irradiated with light, the central portion of each glass plate is heated to a higher temperature than the peripheral portion thereof owing to a distribution of amounts of light, and the resulting difference in thermal deformation produces a compressive stress in the central portion and a tensile stress in the peripheral portion.

The cooler 3 on the incident-side of the liquid crystal panel 2 is disposed between the two polarizing plates 5, 6, so that even the strain resulting from a very small temperature difference in the glass container 30 is detected by the two polarizing plates 5, 6 with high sensitivity. In the case where black is displayed on the liquid crystal panel 2 which is of the so-called normally open type such that the direction of polarization is so determined as to pass light through the liquid crystal display unit when no control voltage is applied to the panel 2, we have found that disturbed polarization occurs in corresponding relation with the strained portion of the glass plate due to a temperature difference, producing a black spot and disturbed contrast.

With the embodiment of FIG. 10, the incident-side polarizing plate 5 is positioned away from the liquid crystal panel 2, the emanating-side polarizing plate 6 is joined to the liquid crystal panel 2, and coolers 3 are joined to the respective polarizing plates 5, 6 from outside.

Accordingly, when light is projected toward the condenser lens 4 in the direction of arrow shown, the light passes through the condenser 4, incident-side polarizing plate 5, liquid crystal panel 2, emanating-side polarizing plate 6 and cooler 3 as arranged in this order.

Although the passage of light raises the temperature of the glass containers 30 of the coolers 3, polarizing plates 5, 6 and liquid crystal panel 2, the heat of the polarizing plates 5, 6 and liquid crystal panel 2 is transferred to the refrigerant 34 within the coolers 3, whereby the plates 5, 6 and panel 2 are prevented from being heated to an excessively high temperature.

Further the incident-side polarizing plate 5 which becomes heated to a higher temperature than the emanating-side polarizing plate 6 is spaced apart from the liquid crystal panel 2, with a space formed between the panel 2 and the plate 5 for air to pass through.

It is only the liquid crystal panel 2 that is present between the two polarizing plates 5, 6, and the coolers 3 are present on the outer side of the respective polarizing plates 5, 6. As a result, even if a strain occurs in the glass containers 30 of the coolers 3 owing to a difference in thermal deformation, the polarizing plates 5, 6 will not detect the strain. This eliminates the disturbance of contrast due to a black luminance spot.

The present invention is not limited to the foregoing embodiments but can be modified variously within the scope defined in the appended claims.

What is claimed is:

1. A liquid crystal projector comprising a transmitting matrix-type liquid crystal display unit disposed in an optical path from a light source toward a projection lens for modulating light in accordance with image data to display images on a screen in the rear of the projection lens, the liquid crystal display unit having joined thereto a flat platelike cooler over the effective image area of the unit, the cooler comprising:
    a flat platelike glass container made of two flat glass plates opposed to each other with a gap therebetween and formed by sealing off the gap along the outer peripheral edges of the glass plates,
    a refrigerant enclosed in the glass container with a vacuum space of specified volume left therein, and
    radiator means provided on the glass container for the vacuum space.

2. The liquid crystal projector as defined in claim 1 wherein the liquid crystal display unit comprises a polarizing plate on the incident-side, a liquid crystal panel having a liquid crystal operable at the position of desired pixels with an electric signal in accordance with image data from outside, and a polarizing plate on the emanating side.

3. The liquid crystal projector as defined in claim 2 wherein the incident-side polarizing plate is disposed away from the liquid crystal panel, and coolers are joined respectively to the liquid crystal panel on the surface thereof on the incident-side and to the incident-side polarizing plate on the surface thereof closer to the light source.

4. The liquid crystal projector as defined in claim 2 wherein the incident-side polarizing plate is disposed away from the liquid crystal panel, and coolers are joined respectively to the liquid crystal panel on the surface thereof on the emanating side and to the incident-side polarizing plate on the surface thereof closer to the light source.

5. The liquid crystal projector as defined in claim 1 wherein the radiator means comprises radiator fins attached directly to the glass wall defining the vacuum space of the glass container.

6. The liquid crystal projector as defined in claim 1 wherein the radiator means comprises a sealed heat pipe containing a small amount of working fluid, the heat pipe having a base end portion attached to a condenser portion of the glass container and a forward end portion extending to the position away from the glass container and provided with the radiator fins.

7. The liquid crystal projector as defined in claim 1 wherein the radiator means comprises a pipe having a base end portion in communication with the condenser portion of the glass container and a forward end portion extending to the position away from the glass container and provided with the radiator fins.

8. The liquid crystal projector as defined in claim 1 wherein the glass container is internally provided with nuclei positioned outside the effective image area for producing bubbles.

9. The liquid crystal projector as defined in claim 1 wherein the glass container has a glass frame provided between the two flat glass plates along the outer peripheral edges thereof.

10. The liquid crystal projector as defined in claim 1 wherein the glass container is formed by interposing minute glass beads or fine glass fibers between the two flat glass plates and sealing off the gap with frit along the outer peripheral edges of the glass plates.

11. The liquid crystal projector as defined in claim 1 wherein the two flat glass plates have rough surfaces opposed to each other, and the gap therebetween is sealed off with frit along the outer peripheral edges of the glass plates to form the glass container.

12. The liquid crystal projector as defined in claim 1 wherein the flat glass plate of the glass container is formed on the inner surface thereof with a guide ridge positioned close to the liquid level of the refrigerant and having at least one end inclined downward toward the side wall of the container.

13. The liquid crystal projector as defined in claim 1 wherein the flat glass plate of the glass container is formed in the inner surface thereof with a guide furrow positioned close to the liquid level of the refrigerant and having at least one end inclined downward toward the side wall of the container.

* * * * *